United States Patent
Love

(10) Patent No.: US 9,586,449 B2
(45) Date of Patent: Mar. 7, 2017

(54) TIRE HEATING SYSTEM

(71) Applicant: Aldera Love, Novi, MI (US)

(72) Inventor: Aldera Love, Novi, MI (US)

(*) Notice: Subject to any disclaimer, the term of this patent is extended or adjusted under 35 U.S.C. 154(b) by 50 days.

(21) Appl. No.: 14/693,082

(22) Filed: Apr. 22, 2015

(65) Prior Publication Data

US 2016/0311278 A1    Oct. 27, 2016

(51) Int. Cl.
| | |
|---|---|
| *B60L 1/02* | (2006.01) |
| *B60C 99/00* | (2006.01) |
| *B60B 7/20* | (2006.01) |
| *B60R 1/00* | (2006.01) |
| *B60K 35/00* | (2006.01) |

(52) U.S. Cl.
CPC .......... *B60C 99/003* (2013.04); *B60B 7/20* (2013.01); *B60K 35/00* (2013.01); *B60R 1/002* (2013.01); *B60R 2300/40* (2013.01); *B60R 2300/60* (2013.01); *B60R 2300/8053* (2013.01)

(58) Field of Classification Search
CPC ......... B60C 99/003; B60B 7/20; B60R 1/002; B60R 2300/40; B60R 2300/60; B60K 35/00; H05B 1/02; H05B 1/0236; H05B 3/0042

USPC .......... 219/202, 204, 497, 494, 506
See application file for complete search history.

(56) References Cited

U.S. PATENT DOCUMENTS

| | | | |
|---|---|---|---|
| 3,077,743 A | 2/1963 | Castro et al. | |
| 5,417,516 A * | 5/1995 | Birtchet | E01C 19/42 219/528 |
| 6,021,843 A | 2/2000 | Roach | |
| D437,808 S | 2/2001 | Gerresheim et al. | |
| 6,350,963 B1 * | 2/2002 | Gray | B60C 9/20 152/151 |
| 6,848,726 B1 | 2/2005 | Horsham | |
| 8,562,023 B2 | 10/2013 | Hino | |
| 8,678,426 B1 | 3/2014 | Browne et al. | |
| 8,714,869 B1 * | 5/2014 | Ries | 219/202 |
| 2008/0292401 A1 * | 11/2008 | Potts | E01C 19/238 404/95 |
| 2009/0151441 A1 * | 6/2009 | Yim | B60C 23/00 73/146.2 |

* cited by examiner

*Primary Examiner* — Mark Paschall

(57) ABSTRACT

A tire heating system for includes a wheel that may be attached to a vehicle. A tire is attached to the wheel and a charging unit is attached to the wheel. The charging unit produces an electrical current when the wheel is rotated. A heating unit is attached to the tire and the heating unit is electrically coupled to the charging unit. The heating unit heating the tire and the heating unit prevents ice formation on the tire.

8 Claims, 4 Drawing Sheets

TIRE HEATING SYSTEM

BACKGROUND OF THE DISCLOSURE

Field of the Disclosure

The disclosure relates to tire heating devices and more particularly pertains to a new tire heating device for preventing the formation of ice on the tire.

SUMMARY OF THE DISCLOSURE

An embodiment of the disclosure meets the needs presented above by generally comprising a wheel that may be attached to a vehicle. A tire is attached to the wheel and a charging unit is attached to the wheel. The charging unit produces an electrical current when the wheel is rotated. A heating unit is attached to the tire and the heating unit is electrically coupled to the charging unit. The heating unit heating the tire and the heating unit prevents ice formation on the tire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
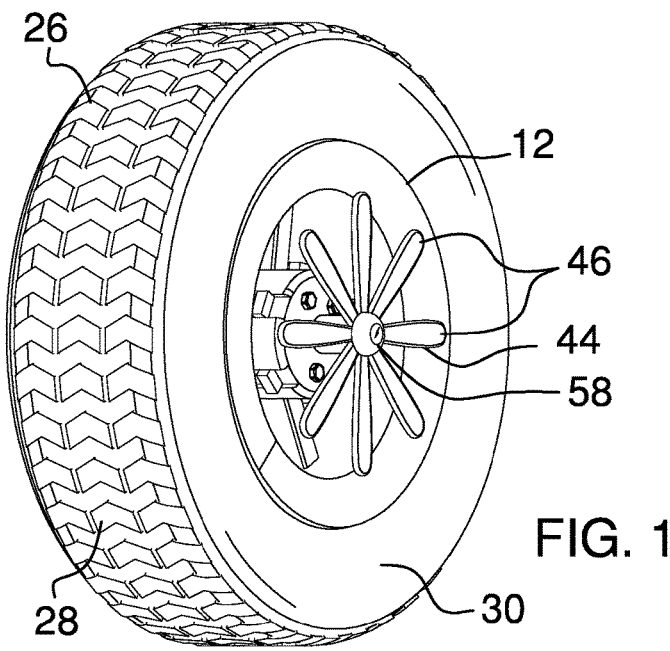
FIG. 1 is a perspective view of a tire heating system according to an embodiment of the disclosure.
Figure 2:
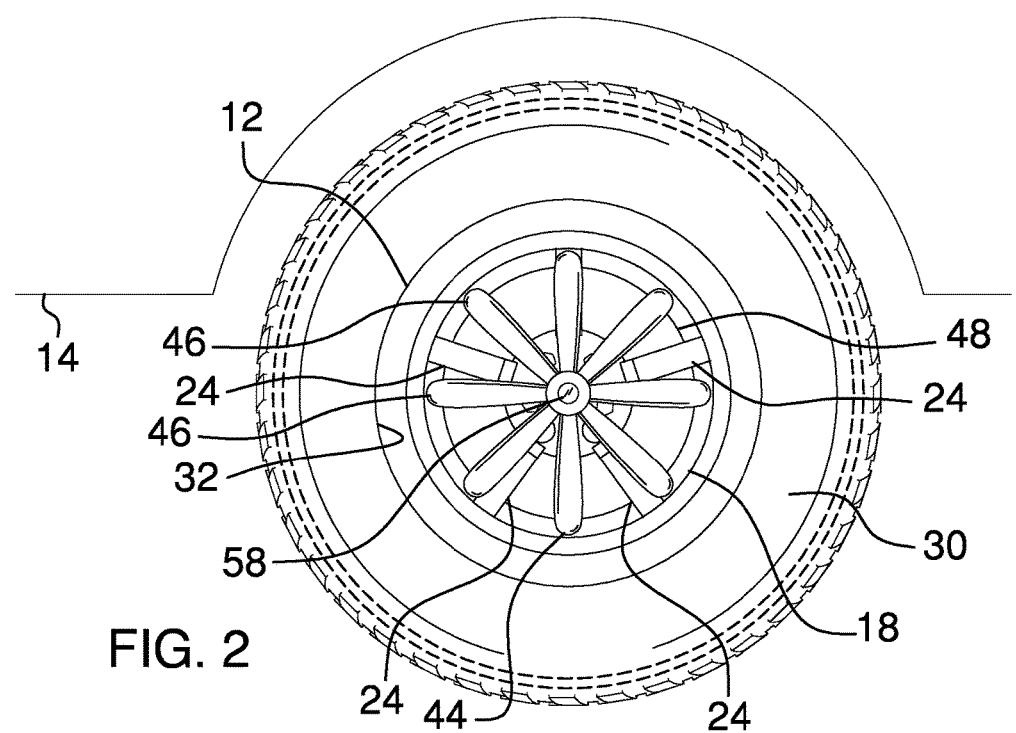
FIG. 2 is a right side view of an embodiment of the disclosure.
Figure 3:
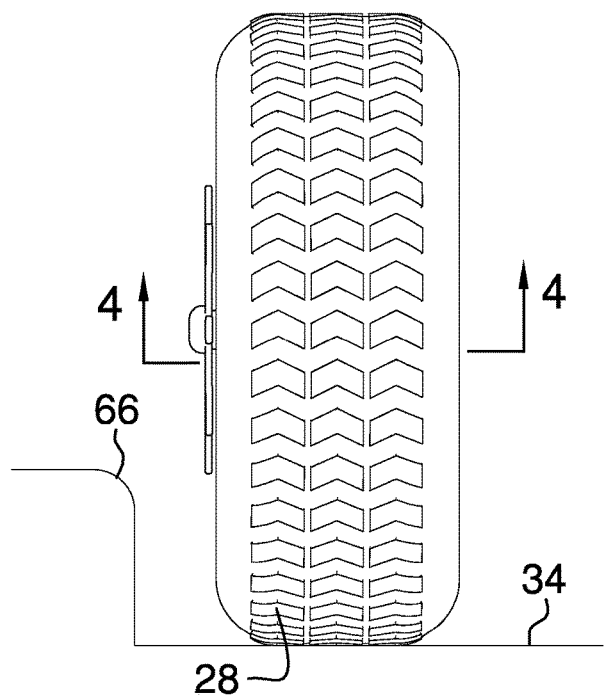
FIG. 3 is a front view of an embodiment of the disclosure.
Figure 4:
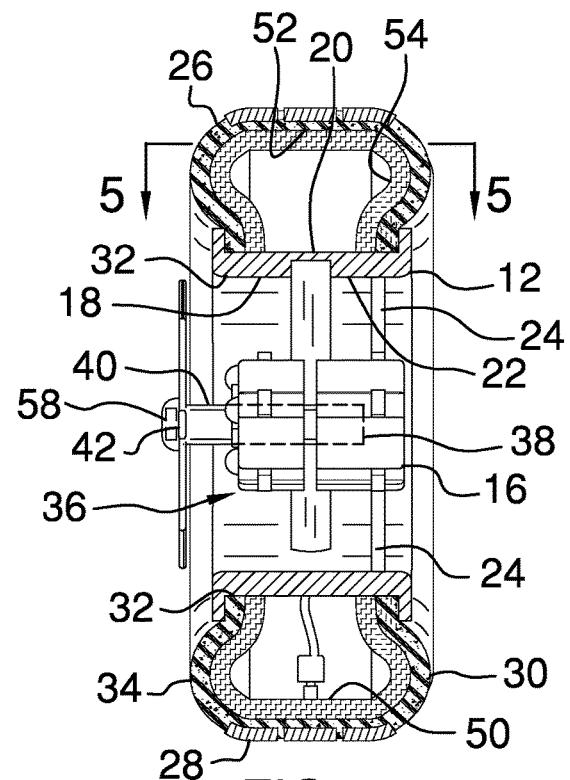
FIG. 4 is a cross sectional view taken along line 4-4 of FIG. 4 of an embodiment of the disclosure.
Figure 5:
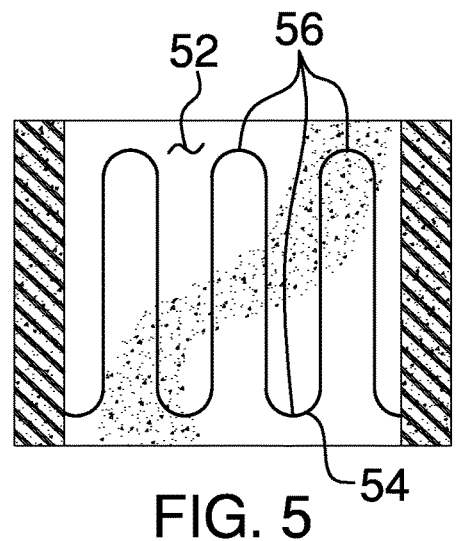
FIG. 5 is a cross sectional view taken along line 5-5 of FIG. 4 of an embodiment of the disclosure.
Figure 6:
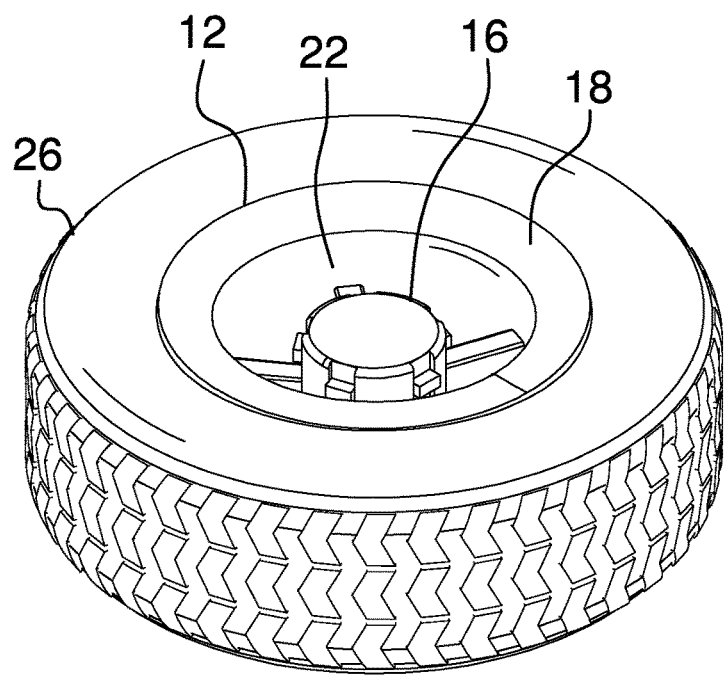
FIG. 6 is a left side perspective view of an embodiment of the disclosure.
Figure 7:
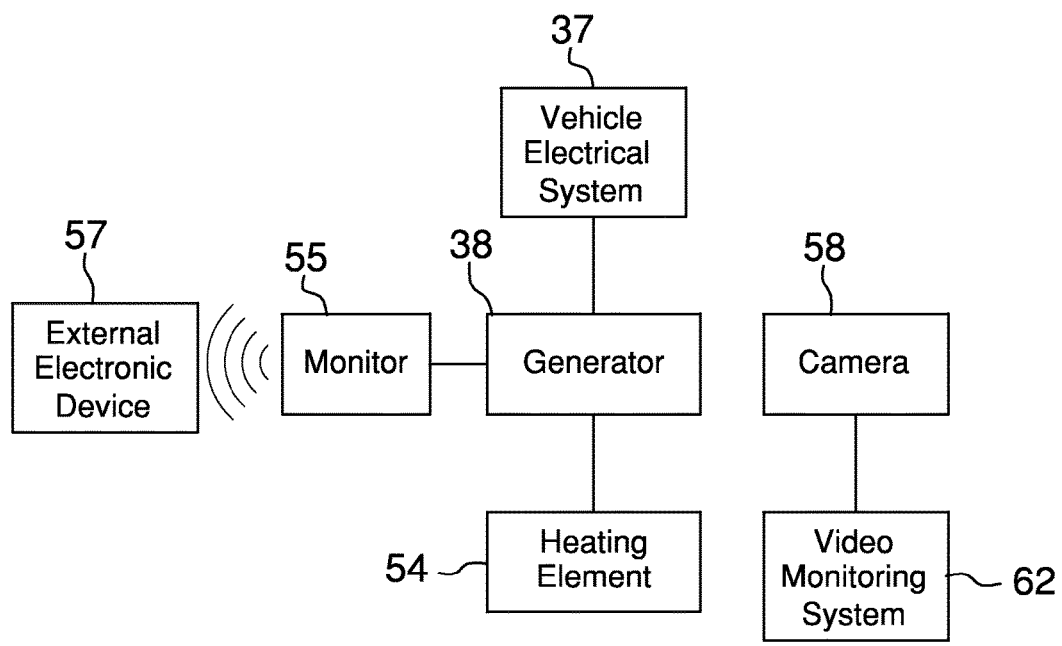
FIG. 7 is a schematic view of an embodiment of the disclosure.

With reference now to the drawings, and in particular to FIGS. 1 through 7 thereof, a new tire heating device embodying the principles and concepts of an embodiment of the disclosure and generally designated by the reference numeral 10 will be described.

As best illustrated in FIGS. 1 through 7, the tire heating system 10 generally comprises a wheel 12 that may be attached to a vehicle 14. The vehicle 14 may be a car or the like and the wheel 12 includes a hub 16 and an outer portion 18. The outer portion 18 has an outer side 20 and an inner side 22 and the inner side 22 faces the hub 16. The outer side 20 is curvilinear with respect to the inner side 22 such that outer portion 18 forms a closed ring and the hub 16 is centrally positioned within the closed ring. The wheel 12 includes a plurality of braces 24 and each of the braces 24 is coupled to and extends between the hub 16 and the inner side 22. The braces 24 are spaced apart from each other and distributed around an entire circumference of the hub 16. The wheel 12 is structured to allow air to flow through between the inner side 22 and the hub 16.

A tire 26 is attached to the wheel 12. The tire 26 has an outwardly facing wall 28 and a pair of lateral walls 30 extending away from the outwardly facing wall 28 and each of the lateral walls 30 is spaced apart from each other. Each of the lateral walls 30 has a distal edge 32 with respect to the outwardly facing wall 28 and each of the lateral walls 30 is curved such that the tire 26 has a donut shape. The tire 26 is positioned around the outer portion 18 of the wheel 12 such that the distal edge 32 engages the outer side 20 of the outer portion 18. The outwardly facing wall 28 may roll along a support surface 34 and the support surface 34 may be a roadway or the like.

A charging unit 36 is attached to the wheel 12 and the charging unit 36 produces an electrical current when the wheel 12 is rotated. The charging unit 36 comprises a generator 38 that is attached to the hub 16. The generator 38 may be an electrical generator or the like. A shaft 40 is coupled to and extends away from the generator 38 and the shaft 40 has a distal end 42 with respect to the generator 38. The distal end 42 is positioned proximate one of the lateral walls 30 of the tire 26. The generator 38 may be electrically coupled to an electrical system 37 of the vehicle 14.

A fan 44 is attached to the distal end 42 and the fan 44 includes a plurality of blades 46. The blades 46 radiate outwardly from the distal end 42 and the blades 46 capture air and rotate when the wheel 12 is rotated. Each of the blades 46 lies on a plane that is planar with the lateral walls 30 of the tire 26. The fan 44 rotates the shaft 40 wherein the shaft 40 rotates the generator 38 thereby facilitating the generator 38 to produce the electrical current. The fan 44 additionally urges air between the inner side 22 of the wheel 12 and the hub 16 to aid in cooling a braking system 48 of the vehicle 14. The fan 44 may be rotated by wind when the vehicle 14 is stationary thereby facilitating the generator 38 to provide electrical power to the vehicle electrical system 37.

A heating unit 50 is attached to the tire 26 and the heating unit 50 is electrically coupled to the charging unit 36. The heating unit 50 heats the tire 26 to prevent ice formation on the tire 26. The outwardly facing wall 28 of the tire 26 and each of the lateral walls 30 of the tire 26 has an inside surface 52. The heating unit 52 comprises a heating element 54 and the heating element 54 is attached to the inside surface 52 of the outwardly facing wall 28 and the inside surface 52 of each of the lateral walls 30. The heating element 54 is electrically coupled to the generator 38 and the heating element 54 comprises a plurality of coils 56. The heating element 54 may have an operational temperature ranging between 65° Fahrenheit and 150° Fahrenheit.

A monitor 55 is provided that may be positioned within the vehicle 14. The monitor 55 is electrically coupled to the heating unit 50 thereby facilitating the monitor 55 to display operational parameters of the heating unit 50. The monitor 55 may comprise a touch screen monitor or the like and the monitor 55 may be manipulated to control the operational parameters of the heating unit 50. The monitor 55 may be in electrical communication with an external electronic device 57 thereby facilitating the monitor 55 to display regional weather conditions with respect to the vehicle 14. The external electronic device 57 may be a cellular phone or other similar external electronic device that is in electrical communication with the internet, a cellular phone network or other electronic communications network.

A camera 58 is movably attached to the distal end 42 of the shaft 40 to facilitate the camera 58 to record a surrounding area with respect to the tire 26. The camera 58 remains stationary about an axis extending longitudinally through the shaft 40 when the shaft 40 is rotated. The camera 58 is electrically coupled to the vehicle 14 such that the vehicle 14 displays the surrounding area thereby facilitating the vehicle 14 to be driven to avoid impacting the tire 26 against an object 60. The object 60 may be a curb or the like and the vehicle 12 may have a video monitoring system 62. The camera 58 may be in communication with the video monitoring system 62.

In use, the fan 44 rotates the shaft 40 when the vehicle 14 is driven. The generator 38 provides the electrical current for the heating unit 50 while the vehicle 14 is driven. The heating unit 50 prevents ice formation on the tire 26 thereby preventing the tire 26 from becoming unbalanced. Additionally, the heating unit 50 heats the tire 26 thereby facilitating the tire 26 to have traction on an icy support surface 34. The fan 44 may be rotated by wind when the vehicle 14 stationary thereby facilitating the heating unit 50 to keep the tire 26 heated while the vehicle 14 is stationary.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tire heating system, said system comprising:
a wheel configured to be attached to a vehicle,
a tire being attached to said wheel;
a charging unit being attached to said wheel, said charging unit producing an electrical current when said wheel is rotated;
a heating unit being attached to said tire such that said heating unit is in thermal communication with said tire, said heating unit being electrically coupled to said charging unit, said heating unit heating said tire wherein said heating unit is configured to prevent ice formation on said tire;
a monitor being configured to be positioned within the vehicle, said monitor being electrically coupled to said heating unit thereby facilitating said monitor to display operational parameters of said heating unit, said monitor being configured to be in wireless communication with an external electronic device thereby facilitating said monitor to display regional weather conditions with respect to the vehicle obtained through wireless communication with the external device;
a shaft having a distal end; and
a camera movably attached to said distal end of said shaft wherein said camera is configured to record a surrounding area with respect to said tire, said camera remaining stationary about an axis extending longitudinally through said shaft when said shaft is rotated, said camera being electrically coupled to said monitor thereby facilitating said monitor to display images recorded by said camera, said camera being configured to be electrically coupled to the vehicle such that the vehicle displays the surrounding area thereby facilitating the vehicle to be driven to avoid impacting said tire against an object.

2. The assembly according to claim 1, wherein said wheel includes a hub and an outer portion, said outer portion having an outer side and an inner side, said inner side facing said hub, said outer side being curvilinear with respect to said inner side such that outer portion forms a closed ring, said hub being centrally positioned within said closed ring, said wheel including a plurality of braces, each of said braces being coupled to and extending between said hub and said inner side, said braces being spaced apart from each other and distributed around an entire circumference of said hub.

3. The assembly according to claim 2, wherein said tire has an outwardly facing wall and a pair of lateral walls extending away from said outwardly facing wall, each of said lateral walls being spaced apart from each other, each of said lateral walls having a distal edge with respect to said outwardly facing wall, each of said lateral walls being curved such that said tire has a donut shape, said tire being positioned around said outer portion of said wheel such that said distal edge engages said outer side of said outer portion, said outwardly facing wall being configured to roll along a support surface.

4. The assembly according to claim 1, further comprising:
a hub; and
said charging unit comprising a generator attached to said hub.

5. The assembly according to claim 4, further comprising:
said tire having a pair of lateral walls; and
a shaft coupled to and extending away from said generator, said shaft having a distal end with respect to said generator, said distal end being positioned proximate one of said lateral walls of said tire.

6. The assembly according to claim 1, further comprising said tire including an outwardly facing wall and a pair of lateral walls;
a generator; and
said heating unit comprising a heating element, said outwardly facing wall of said tire and each of said lateral walls of said tire having an inside surface, said heating element being attached to said inside surface of said outwardly facing wall and said inside surface of each of said lateral walls, said heating element being electrically coupled to said generator, said heating element comprising a plurality of coils.

7. A tire heating system, said system comprising:
a wheel configured to be attached to a vehicle,
a tire being attached to said wheel, said tire having a pair of lateral walls;

a charging unit being attached to said wheel, said charging unit producing an electrical current when said wheel is rotated;

a heating unit being attached to said tire such that said heating unit is in thermal communication with said tire, said heating unit being electrically coupled to said charging unit, said heating unit heating said tire wherein said heating unit is configured to prevent ice formation on said tire;

a monitor being configured to be positioned within the vehicle, said monitor being electrically coupled to said heating unit thereby facilitating said monitor to display operational parameters of said heating unit, said monitor being configured to be in wireless communication with an external electronic device thereby facilitating said monitor to display regional weather conditions with respect to the vehicle obtained through wireless communication with the external device;

a hub, said charging unit comprising a generator attached to said hub;

a shaft coupled to and extending away from said generator, said shaft having a distal end with respect to said generator, said distal end being positioned proximate one of said lateral walls of said tire; and a fan attached to said distal end, said fan including a plurality of blades, said blades radiating outwardly from said distal end, said blades being configured be capture air and rotate when said wheel is rotated, said fan rotating said shaft such wherein said shaft rotates said generator thereby facilitating said generator to produce the electrical current.

8. A tire heating system, said system comprising:

a wheel being configured to be attached to a vehicle, said wheel including a hub and an outer portion, said outer portion having an outer side and an inner side, said inner side facing said hub, said outer side being curvilinear with respect to said inner side such that outer portion forms a closed ring, said hub being centrally positioned within said closed ring, said wheel including a plurality of braces, each of said braces being coupled to and extending between said hub and said inner side, said braces being spaced apart from each other and distributed around an entire circumference of said hub;

a tire being attached to said wheel, said tire having an outwardly facing wall and a pair of lateral walls extending away from said outwardly facing wall, each of said lateral walls being spaced apart from each other, each of said lateral walls having a distal edge with respect to said outwardly facing wall, each of said lateral walls being curved such that said tire has a donut shape, said tire being positioned around said outer portion of said wheel such that said distal edge engages said outer side of said outer portion, said outwardly facing wall being configured to roll along a support surface;

a charging unit being attached to said wheel, said charging unit producing an electrical current when said wheel is rotated, said charging unit comprising a generator attached to said hub, a shaft being coupled to and extending away from said generator, said shaft having a distal end with respect to said generator, said distal end being positioned proximate one of said lateral walls of said tire, and a fan being attached to said distal end, said fan including a plurality of blades, said blades radiating outwardly from said distal end, said blades being configured be capture air and rotate when said wheel is rotated, said fan rotating said shaft such wherein said shaft rotates said generator thereby facilitating said generator to produce the electrical current, a heating unit being attached to said tire such that said heating unit is in thermal communication with said tire, said heating unit being electrically coupled to said charging unit, said heating unit heating said tire wherein said heating unit is configured to prevent ice formation on said tire, said heating unit comprising a heating element, said outwardly facing wall of said tire and each of said lateral walls of said tire having an inside surface, said heating element being attached to said inside surface of said outwardly facing wall and said inside surface of each of said lateral walls, said heating element being electrically coupled to said generator, said heating element comprising a plurality of coils;

a monitor being configured to be positioned within the vehicle, said monitor being electrically coupled to said heating unit thereby facilitating said monitor to display operational parameters of said heating unit, said monitor being configured to be in wireless communication with an external electronic device thereby facilitating said monitor to display regional weather conditions with respect to the vehicle obtained through wireless communication with the external device; and a camera being movably attached to said distal end of said shaft wherein said camera is configured to record a surrounding area with respect to said tire, said camera remaining stationary about an axis extending longitudinally through said shaft when said shaft is rotated, said camera being electrically coupled to said monitor thereby facilitating said monitor to display images recorded by said camera, said camera being configured to be electrically coupled to the vehicle such that the vehicle displays the surrounding area thereby facilitating the vehicle to be driven to avoid impacting said tire against an object.

\* \* \* \* \*